United States Patent Office 3,076,767
Patented Feb. 5, 1963

3,076,767
PROCESS FOR PRODUCING ELECTROLUMINESCENT PROSPHORS
Sixdeniel Faria, Lindenhurst, and Paul Goldberg, Long Beach, N.Y., assignors to General Telephone and Electronics Laboratories, Inc., a corporation of Delaware
No Drawing. Filed June 27, 1961, Ser. No. 119,820
10 Claims. (Cl. 252—301.6)

Our invention relates to electroluminescent phosphors and processes for making the same.

Electroluminescent phosphors are phosphors which emit light in the presence of an electric field. Conventionally, such phosphors are dispersed in a dielectric medium and the dispersion is placed between two electrodes, at least one of which permits the passage of light therethrough to produce an electroluminescent lamp. When a voltage is applied between the electrodes, light is emitted from the dispersion.

We have succeeded in developing a new process for produce electroluminescent phosphors which results in a phosphor with significantly increased efficiency and enhanced brightness.

Accordingly, it is an object of the present invention to provide a new and improved process for making electroluminescent phosphors.

Another object is to improve the processing of electroluminescent phosphors in such manner as to sharply increase their efficiency.

Still another object is to provide a process for making electroluminescent phosphors having greatly increased efficiency and enhanced brightness.

These and other objects of our invention will either be explained or will become apparent hereinafter.

In accordance with the principle of our invention, a copper activator and at least one halide coactivator selected from the class consisting of chloride, iodide and bromide are added to a base material of zinc sulfide. The resultant mixture is then fired to a temperature falling within the approximate range 1000°–13000° C. to produce a starting material having a copper activator concentration falling within the approximate range $1 \times 10^{-4}$ to $5 \times 10^{-3}$ gram atoms per mole of base material, and a halide coactivator concentration also falling within the approximate range $1 \times 10^{-4}$ to $5 \times 10^{-3}$ gram atoms per mole of base material.

This essentially non-electroluminescent starting material is then etched with an aqueous solution of hydrogen peroxide for a predetermined period of time within the temperature range 60°–85° C. The partially oxidized phosphor, together with solid reaction products, is next dried, mixed with at least $1 \times 10^{-5}$ gram atoms of copper per mole of base material and fired at a temperature in the range 750° to 950° C. The efficiency of the resulting electroluminescent phosphor is considerably greater than that of electroluminescent phosphors which have not been treated with hydrogen peroxide in the manner described.

An additional treatment which provide increased brightness and efficiency consists of reacting the electroluminescent phosphor with an acid solution of hydrogen peroxide at a temperature of about 70° C. After washing, an electroluminescent phosphor is produced having an efficiency and brightness which is considerably greater than that of conventionally prepared phosphors.

Illustrative embodiments of our invention will now be described in more detail with reference to the examples which follow.

*Example I*

Copper sulfate was thoroughly mixed with 1000 grams of zinc sulfide powder in an amount sufficient to establish a copper concentration of $1 \times 10^{-3}$ gram atoms per mole of zinc sulfide. A chloride flux was blended with the mixture in an amount equal to about 8% by weight of the zinc sulfide, the flux consisting of 3% barium chloride, 3% magnesium chloride and 2% sodium chloride, each percentage being by weight of zinc sulfide. This blend was then fired in a covered crucible in air to a temperature of 1150° C. for six hours resulting in a non-electroluminescent, well crystallized phosphor starting material. The phosphor was next washed in water until excess halides were removed.

This essentially non-electroluminescent phosphor starting material was then chemically reacted with a 30% concentration of hydrogen peroxide for a period of ten minutes at a temperature maintained between 60° and 85° C. At the end of the ten minute reaction time, the sample was stopped from further oxidation by adding water and then decanting the excess reacting solution. The oxidized phosphor, together with the adhering products of reaction (mostly sulfur and zinc oxide), was dried at a temperature of about 110° C. The phosphor was next activated by mixing $1 \times 10^{-3}$ gram atoms of copper per mole of zinc sulfide and 5% zinc oxide with the phosphor and firing in a muffle furnace at 800° C. for 40 minutes. This thermal treatment was carried on in an air atmosphere. After activation, the samples were washed with 50% acetic acid, water and 3% potassium cyanide solutions in that order and then dried at a temperature of about 110° C.

This phosphor when tested in an electroluminescent lamp was found to have increased efficiency as compared to electroluminescent phosphors which had not been treated with hydrogen peroxide. More specifically, the efficiency of our phosphor when dispersed in a demountable castor oil cell having 2:1 ratio of phosphor to dielectric and activated by a 200 volt, 400 cycles per second alternating voltage source was 7.4 lumens per watt. The efficiency of a control phosphor which had not been treated with hydrogen peroxide was 6.0 lumens per watt. The color of the electroluminescence emitted by the phosphor varies from green to blue as the frequency is varied from 60 to 6000 cycles per second. With higher copper concentration, about $1.3 \times 10^{-3}$ gram atom per mole zinc sulfide, the color of the emission is green at all frequencies.

The measurements were repeated with phosphors which had been reacted with a 30% concentration of hydrogen peroxide for different intervals of time. The efficiencies obtained were as follows:

| Time, minutes: | Efficiency, lumens per watt |
|---|---|
| 20 | 8.8 |
| 30 | 7.8 |
| 60 | 9.4 |

This improvement was significant when compared with the efficiency of 6.0 lumens per watt obtained with the control sample.

*Example II*

The process of Example I was repeated using a starting material having a copper concentration of $1.3 \times 10^{-3}$ gram atom per mole of zinc sulfide and various concentrations of hydrogen peroxide. The electroluminescent color emitted by the resulting phosphor was green. The efficiency in lumens per watt obtained in a castor oil cell operated at 400 cycles per second and 200 volts is given below.

| Etching Time (Minutes) | Efficiency in lumens per watt | | |
|---|---|---|---|
| | 15% $H_2O_2$ | 7.5% $H_2O_2$ | 3.8% $H_2O_2$ |
| 10 | 6.8 | 6.6 | 6.6 |
| 20 | 6.6 | 6.9 | 7.4 |
| 30 | 8.2 | 7.5 | 8.6 |
| 60 | 8.2 | 8.0 | 8.8 |

An electroluminescent phosphor produced from the same starting material but not treated with hydrogen peroxide had an efficiency of 5.8 lumens per watt.

*Example III*

The process of Example I was repeated for a yellow-emitting manganese activated phosphor. This material was prepared as follows: The starting phosphor material, having a copper concentration of $2 \times 10^{-4}$ gram atoms per mole of zinc sulfide and a chloride concentration of $5 \times 10^{-4}$ gram per mole of zinc sulfide was etched with a 15% solution of hydrogen peroxide for 30 minutes at a temperature in the range 60° C.–85° C. After drying, 4% manganese as manganese carbonate and 1% copper as copper sulfate, each percentage being by weight of zinc sulfide, were added to the etched phosphor. The mixture was next fired at a temperature of 800° C. The efficiency of the phosphor was found to be 4.4 lumens per watt as compared to 3.2 lumens per watt for the unetched phosphor. The brightness at the same conditions, i.e. 400 cycles per second, 67 volts per mil, was 11 foot-lamberts as compared to 8.5 foot-lamberts for the unetched phosphor.

This electroluminescent phosphor was next given a post-etching treatment which further increased its brightness and efficiency. The phosphor was first reacted with a 7.5% solution of hydrogen peroxide in 3 normal hydrochloric acid for 15 minutes at a temperature of about 70° C. It was then washed with ethanol to remove the water after which it was rinsed with carbon disulfide to remove the yellow coloration due to sulphur on the phosphor particles. The phosphor was again washed with ethanol to dissolve the carbon disulfide, rinsed with cold water, and then washed with 5% potassium cyanide to remove any exposed copper. Finally, the phosphor was rinsed with hot water until the potassium cyanide was no longer detectable.

A series of electroluminescent phosphors which recieved this treatment showed 40% to 50% increases in brightness over that of the untreated phosphors. These tests were made in a cell energized at 400 cycles per second, 67 volts per mil with a ratio of phosphor to dielectric of 2:1. The following table indicates the relative brightness of the untreated electroluminescent phosphor and the phosphors which were pre- and post-treated as described.

| Brightness of Un-etched Electroluminescent Phosphor, foot-lamberts | Brightness of Pre- and Post-etched Electroluminescent Phosphor, foot-lamberts |
|---|---|
| 7.0 | 10.5 |
| 9.1 | 13.0 |
| 7.5 | 11.0 |

The efficiency of the phosphor when tested at the same conditions of brightness showed an improvement as indicated in the following table:

| Efficiency of Un-etched Electroluminescent Phosphor, lumens per watt | Efficiency of Pre- and Post-etched Electroluminescent Phosphor, lumens per watt |
|---|---|
| 1.9 | 3.6 |
| 2.8 | 3.7 |
| 2.7 | 4.0 |

Further tests disclosed that the pre-treatment may be successfully carried out when the concentration of the aqueous solution of hydrogen peroxide is in the range 3.75–30 percent and the etching time is between 10 and 60 minutes. In addition, tests indicate that the post-treatment may be successfully employed for a period of 10 to 60 minutes in an acid solution of hydrogen peroxide having a concentration in the range 3.75% to 30% hydrogen peroxide in hydrochloric acid having a concentration between 3 normal and 6 normal.

As many changes could be made in the above described process it is intended that all matter contained therein shall be interpreted as illustrative and not in a limiting sense.

What is claimed is:

1. A process for producing an electroluminescent phosphor from copper activated-halide coactivated non-electroluminescent zinc sulfide comprising the steps of etching said non-electroluminescent zinc sulfide with a hydrogen peroxide solution having a concentration in the range 3.75–30 percent for an interval of 10–60 minutes at a temperature range of 60° C.–85° C., mixing said non-electroluminescent zinc sulfide with at least $1 \times 10^{-5}$ gram atoms of copper per mole of zinc sulfide, and firing said mixture in a temperature range of approximately 750° C. to 950° C. for approximately 40 minutes, the resulting electroluminescent phosphor having an efficiency greater than that of an equivalent unetched phosphor.

2. A process for producing an electroluminescent phosphor from copper activated-halide coactivated non-electroluminescent zinc sulfide comprising the steps of etching said non-electroluminescent zinc sulfide with a hydrogen peroxide solution having a concentration in the range 3.75–30 percent for an interval of 10–60 minutes at a temperature range of 60° C.–85° C., mixing said non-electroluminescent zinc sulfide with at least $1 \times 10^{-5}$ gram atoms of copper per mole of zinc sulfide, firing said mixture in a temperature range of approximately 750° C. to 950° C., reacting said fired mixture with a solution of hydrogen peroxide in hydrochloric acid, the concentration of said hydrogen peroxide being in the range 3.75–30 percent and the concentration of said hydrochloric acid being in the range 3 normal to 6 normal.

3. A process for producing an electroluminescent phosphor from copper activated-halide coactivated non-electroluminescent zinc sulfide comprising the steps of etching said non-electroluminescent zinc sulfide with a hydrogen peroxide solution having a concentration in the range 3.75–30 percent for an interval of 10–60 minutes at a temperature range of 60° C.–85° C., mixing said non-electroluminescent zinc sulfide with at least $1 \times 10^{-5}$ gram atoms of copper per mole of zinc sulfide, firing said mixture in a temperature range of approximately 750° C. to 950° C., reacting said fired mixture with a solution of hydrogen peroxide in hydrochloric acid for between 10 and 60 minutes at a temperature of about 70° C., the concentration of said hydrogen peroxide being in the range 3.75–30 percent and the concentration of said hydrochloric acid being in the range 3 normal to 6 normal.

4. A process for producing an electroluminescent phosphor from a zinc sulfide starting material having a copper concentration within the approximate range $1 \times 10^{-4}$– $5 \times 10^{-3}$ gram atoms per mole of base material and a halide concentration with the approximate range $1 \times 10^{-4}$–$5 \times 10^{-3}$ gram atoms per mole of base material comprising the steps of etching said starting material with a hydrogen peroxide solution having a concentration in the range 3.75–30 percent for an interval of 10–60 minutes at a temperature range of 60°C.–85° C., mixing the etched base material with at least $1 \times 10^{-5}$ gram atoms of copper per mole of base material, and firing said mixture in a temperature range of approximately 750° C. to 950° C.

5. A process for producing an electroluminescent phosphor from a copper activated-chloride coactivated non-electroluminescent zinc sulfide comprising the steps of etching said non-electroluminescent zinc sulfide with a hydrogen peroxide solution having a concentration of 30% for a period of 10 minutes at a temperature maintained between 60° C. and 85° C., mixing said phosphor with $1 \times 10^{-3}$ gram atoms of copper per mole of zinc sulfide, and firing the mixture in air to 800° C. to produce a green electroluminescent phosphor.

6. A process for producing an electroluminescent phosphor from a copper activated-chloride coactivated non-electroluminescent zinc sulfide comprising the steps of etching said non-electroluminescent zinc sulfide with a hydrogen peroxide solution having a concentration of 30% for a period of 60 minutes at a temperature maintained between 60° C. and 85° C., mixing said phosphor with $1 \times 10^{-3}$ gram atoms of copper per mole of zinc sulfide, and firing the mixture in air to 800° C. to produce a green electroluminescent phosphor.

7. A process for producing an electroluminescent phosphor from a copper activated-chloride coactivated non-electroluminescent zinc sulfide comprising the steps of etching said non-electroluminescent zinc sulfide with a hydrogen peroxide solution having a concentration of 3.8% for a period of 10 minutes at a temperature maintained between 60° C. and 85° C., mixing said phosphor with $1 \times 10^{-3}$ gram atoms of copper per mole of zinc sulfide, and firing the mixture in air to 800° C. to produce a green electroluminescent phosphor.

8. A process for producing an electroluminescent phosphor from a copper activated-chloride coactivated non-electroluminescent zinc sulfide comprising the steps of etching said non-electroluminescent zinc sulfide with a hydrogen peroxide solution having a concentration of 3.8% for a period of 60 minutes at a temperature maintained between 60° C. and 85° C., mixing said phosphor with $1 \times 10^{-3}$ gram atoms of copper per mole of zinc sulfide, and firing the mixture in air to 800° C. to produce a green electroluminescent phosphor.

9. A process for producing a yellow-emitting electroluminescent phosphor from a zinc sulfide starting material having a copper concentration of $2 \times 10^{-4}$ gram atoms per mole of zinc sulfide and a chloride concentration of $5 \times 10^{-4}$ gram atoms per mole of zinc sulfide comprising the steps of etching said starting material with a hydrogen peroxide solution having a concentration of 15% for 30 minutes at a temperature in the range 60° C.–85° C., mixing said starting material with 4% manganese and 1% copper by weight of zinc sulfide, and firing said mixture at a temperature of 800° C.

10. A process for producing a yellow-emitting electroluminescent phosphor from a zinc sulfide starting material having a copper concentration of $2 \times 10^{-4}$ gram atoms per mole of zinc sulfide and a chloride concentration of $5 \times 10^{-4}$ gram atoms per mole of zinc sulfide comprising the steps of etching said starting material with a hydrogen peroxide solution having a concentration of 15% for 30 minutes at a temperature in the range 60° C.–85° C., mixing said starting material with 4% manganese and 1% copper by weight of zinc sulfide, firing said mixture at a temperature of 800 C., reacting said mixture with a solution of hydrogen peroxide in hydrochloric acid for 15 minutes at a temperature of approximately 70° C., the concentration of said hydrogen peroxide being 7.5% and the concentration of said hydrochloric acid being 3 normal, and washing said phosphor to remove excess sulfur and copper.

References Cited in the file of this patent

UNITED STATES PATENTS

| | | |
|---|---|---|
| 2,743,238 | Hunt et al. | Apr. 24, 1956 |
| 2,821,509 | Hunt et al. | Jan. 28, 1958 |